United States Patent [19]
Fujiwara

[11] Patent Number: 5,808,835
[45] Date of Patent: Sep. 15, 1998

[54] HEAD SUPPORTING DEVICE UTILIZING ADHESIVE TO SECURE THE LOAD BEAM TO THE ACTUATOR ARM IN A DISK DRIVE SYSTEM

[75] Inventor: Tetsuya Fujiwara, Yokohama, Japan

[73] Assignee: NHK Spring Co., Ltd., Yokohama, Japan

[21] Appl. No.: 892,815

[22] Filed: Jul. 15, 1997

[30] Foreign Application Priority Data

Jul. 18, 1996 [JP] Japan .................................. 8-189425

[51] Int. Cl.$^6$ ...................................................... G11B 5/48
[52] U.S. Cl. ............................................................. 360/104
[58] Field of Search .............................................. 360/104

[56] References Cited

U.S. PATENT DOCUMENTS 5,602,698  2/1997  Miyazaki ................................ 360/104

*Primary Examiner*—A. J. Heinz
*Attorney, Agent, or Firm*—Frishauf, Holtz, Goodman, Langer & Chick

[57] ABSTRACT

A head supporting apparatus comprises an arm driven by a positioning motor of a disk drive and a suspension adhered to a suspension attachment portion of the arm via a base plate. The suspension includes a load beam, a head, and so on. A coarse surface is provided on a surface of the base plate which is brought into contact with the adhesive. The coarse surface has a function of rendering adhesion of the adhesive to the base plate greater than adhesion of the adhesive to the arm. The coarse surface is obtained by forming a number of minute cavities on the base plate by a press process.

6 Claims, 4 Drawing Sheets

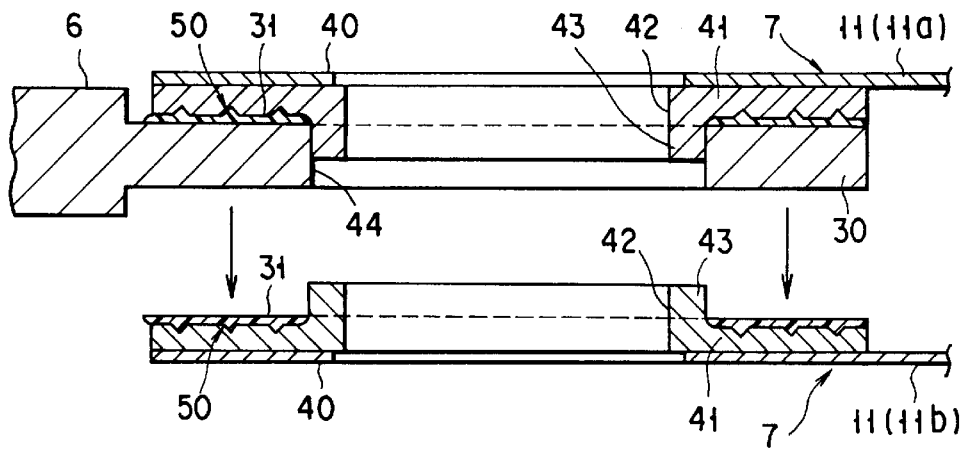
F I G. 6
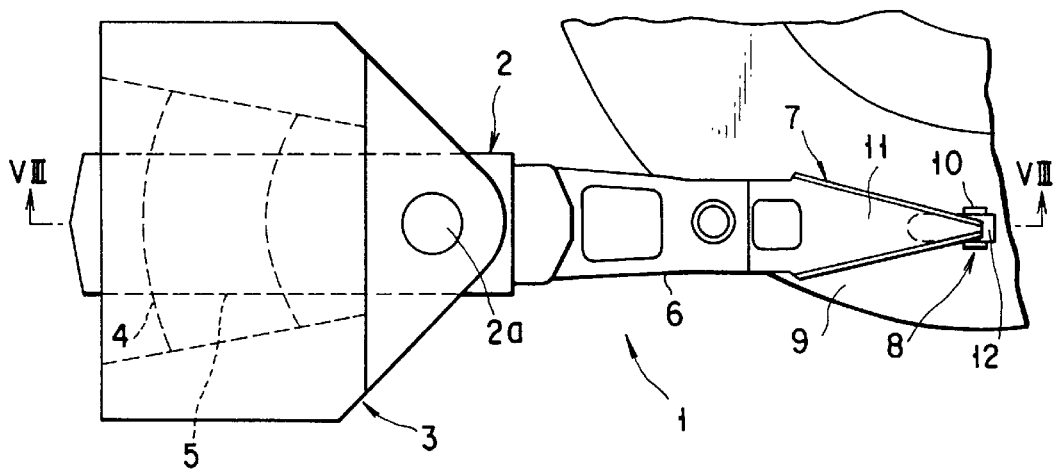
F I G. 7
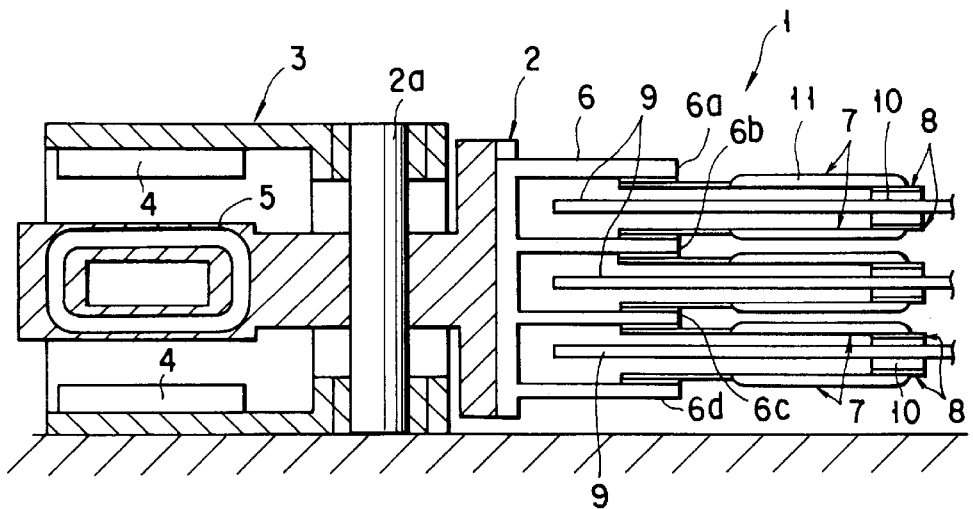
F I G. 8 ized apparatus for use in a disk drive having an arm driven by a positioning motor and a suspension to which a head is attached at its distal end portion, the apparatus comprising:

HEAD SUPPORTING DEVICE UTILIZING ADHESIVE TO SECURE THE LOAD BEAM TO THE ACTUATOR ARM IN A DISK DRIVE SYSTEM

BACKGROUND OF THE INVENTION

The present invention relates to a head supporting device of a disk drive in an information processing apparatus, such as a personal computer, and more particularly to a structure for fixing an actuator arm and a suspension.

FIGS. 7 and 8 show part of a hard disk drive (HDD) 1. A carriage 2 of the disk drive 1 is driven to rotate about an axis 2a by a positioning motor 3, for example, a voice coil motor. The carriage 2 comprises a coil portion 5 arranged in proximity to a magnet 4, an arm (actuator arm) 6 located fixed to the coil portion 5, a suspension 7 located at a free end portion of the arm 6, and a head 8 attached to a top end portion of the suspension 7. When the carriage 2 is rotationally driven by the motor 3 as described above, the head 8 is moved to a desired track of a hard disk 9.

The head 8 comprises a slider 10, mounted to a position which can face a track of the disk 9, and a transducer (not shown) held by the slider 10. When the disk 9 is rotated at high speed, the slider 10 is moved up slightly above the disk 9, thereby forming air bearing between the disk 9 and the slider 10.

As shown in FIG. 8, the arm 6 has a plurality of stages corresponding to the number of disks 9 and arranged vertically. In the case of FIG. 8, a suspension 7 is provided for each of an uppermost arm 6a and a lowermost arm 6d, and a pair of upper and lower suspensions 7 are provided for each of inter-mediate arms 6b and 6c.

Each suspension 7 comprises a load beam 11 constituted by a precision thin plate metal spring and a flexible member 12 called a flexure and constituted by a very thin metal plate. The flexible member 12 is fixed to a top end portion of the load beam 11 by laser welding or the like. The slider 10 is supported by the flexible member 12.

Fixing means as shown in FIGS. 9A to 9C have been conventionally known as means for fixing the suspension 7 to the arm 6. In the fixing means shown in FIG. 9A, boss portions 20 are formed in base plates 22 provided in proximal portions of a pair of upper and lower load beams 11a and 11b. The boss portions 20 are inserted in a hole 21 of an arm 6, and then caulked by a steel ball, jig or the like. As a result, the load beams 11a and 11b are fixed to the arm 6.

The fixing means shown in FIG. 9B is called an interlock type. Boss portions 20a and 20b of base plates 22 of a pair of upper and lower load beams 11a and 11b are inserted in a hole 21 of an arm 6. The boss portions 20a and 20b are engaged with each other, thereby fixing the load beams 11a and 11b to the arm 6. The fixing means of the interlock type has an advantage in that the height $H_2$ of the carriage can be smaller than the height $H_1$ of the carriage shown in FIG. 9A.

The fixing means of an adhesion type as shown in FIG. 9C has a base plate 22 between an arm 6 and load beams 11a and 11b. The load beams 11a and 11b are fixed to the arm 6 by adhesive 23, such as epoxy resin. The base plate 22 is fixed to the load beams 11a and 11b in advance by laser welding or the like. Since the height $H_3$ of the carriage can be smaller, the fixing means of an adhesion type is advantageous in making the overall disk drive thinner and increasing the integration density. However, the fixing means using the adhesive 23 has the following problems.

The carriage, completed by attaching the suspension 7 to the arm 6 during a process of assembling the carriage, is subjected to a test to examine whether requirements for predetermined performance are satisfied. Carriages which passed the test are delivered as products. If in the test, a carriage does not satisfy the requirements for the predetermined performance, due to, for example, a defect in the suspension 7, rework may be performed to remove only the suspension 7 from the arm 6 and attach a new suspension 7 to the arm 6. In this case, the carriage as a whole is not discarded.

In the rework, the suspension 7 is peeled off the arm 6 by a jig or the like. However, the adhesive 23 (shown in FIG. 9C) is liable to remain on the arm 6. A process of removing the adhesive 23 from the arm 6 is not only troublesome but also likely to raise comparatively many problems: for example, the arm itself may be damaged. The present inventor searched for the reason why the adhesive is liable to remain on the arm, and discovered the following matters.

Since the arm 6 of this type has a complex form as shown in FIG. 8, it is technically difficult and economically impractical to shape a solid metal material into an arm 6 of a desired form by machining. Therefore, in general, the arm 6 of this type is of a die cast form made of a light alloy, such as aluminum alloy. After the arm is formed, the surface of a suspension attachment portion of the arm is polished, and the suspension 7 is attached thereto by the adhesive. However, small pores or cavities in the die cast form are exposed on the surface of the suspension attachment portion by the aforementioned polishing of the arm 6. If the adhesive 23 enters in the pores or cavities, the adhesion between the adhesive and the arm is increased.

On the other hand, since the base plate 22 is of a pressed form made of metal, such as stainless steel, the surface which is adhered to the arm 6 is relatively smooth. Therefore, if the arm 6 is adhered to the base plate 22 by the adhesive 23, the adhesion of the adhesive 23 to the arm 6 is greater than that to the base plate 22. For this reason, when the arm 6 is peeled off the base plate 22, the adhesive 23 tends to remain on the arm 6. Further, when the adhesive 23 remaining on the arm 6 is to be removed, the above-mentioned problem arises.

BRIEF SUMMARY OF THE INVENTION

It is accordingly an object of the present invention to provide a head supporting apparatus for use in a disk drive which can prevent the adhesive from remaining on the arm, when the suspension adhered to the arm by the adhesive is removed from the arm, and which can reduce or obviate a process of removing the adhesive from the arm.

To achieve the above object, according to the present invention, there is provided a head supporting apparatus for use in a disk drive having an arm driven by a positioning motor and a suspension to which a head is attached at its distal end portion, the apparatus comprising:

a base plate having first and second surfaces, the first surface being fixed to the suspension;

an adhesive provided between the second surface of the base plate and an end portion of the arm;

adhesion strengthening means, provided on the second surface of the base plate, for rendering adhesion of the adhesive to the base plate greater than adhesion of the adhesive to the arm.

An example of the adhesion strengthening means is a coarse surface obtained by forming a number of minute cavities on the base plate by a press process. The base plate is made of, for example, austenitic stainless steel, which contains substantially no sulfur. The base plate is fixed to a load beam made of the stainless steel by laser welding. The arm is of a die cast form made of, for example, aluminum alloy, and the surface of the suspension attachment portion of the arm is polished.

The arm and the base plate are fixed to each other by heat-hardening adhesive provided therebetween. According to the present invention, the adhesion strengthening means constituted by a number of cavities is provided on the surface of the base plate, to which the adhesive is applied. Therefore, adhesion (peel strength) of the adhesive to the base plate is rendered greater than adhesion (peel strength) of the adhesive to the arm.

After the adhesive is hardened, if it is required to remove the suspension from the arm for some reason, the base plate will be peeled off the suspension attachment portion of the arm by a jig or the like. In this case, since the adhesive is firmly adhered to the base plate, the base plate is peeled off from the arm with the adhesive adhered thereto. Although the adhesive remains on the base plate of the suspension peeled off the arm, it is unnecessary to remove the adhesive from the base plate of the suspension, since this suspension is discarded.

As described above, according to the present invention, when the suspension adhered to the arm by adhesive is exchanged with another, even if the adhered portion between the base plate of the suspension and the arm is peeled, the adhesive can be prevented from remaining on the arm. For this reason, it is substantially unnecessary to remove the adhesive from the arm. Even if the adhesive remains on the arm, it can be removed easily and the arm cannot be damaged, since the amount thereof is very little. Therefore, it is only necessary to discard the suspension removed from the arm, and most of the structural elements of the carriage, such as the arm, are not wasted. As a result, the yield in the carriage assembling process is increased and the manufacturing cost is reduced.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a cross-sectional view showing a state where the suspension is removed from the arm;

FIG. 7 is a plan view showing part of a hard disk drive;

FIG. 8 is a cross-sectional view of the hard disk drive taken along the line VIII—VIII in FIG. 7.

DETAILED DESCRIPTION OF THE INVENTION

Figure 1:
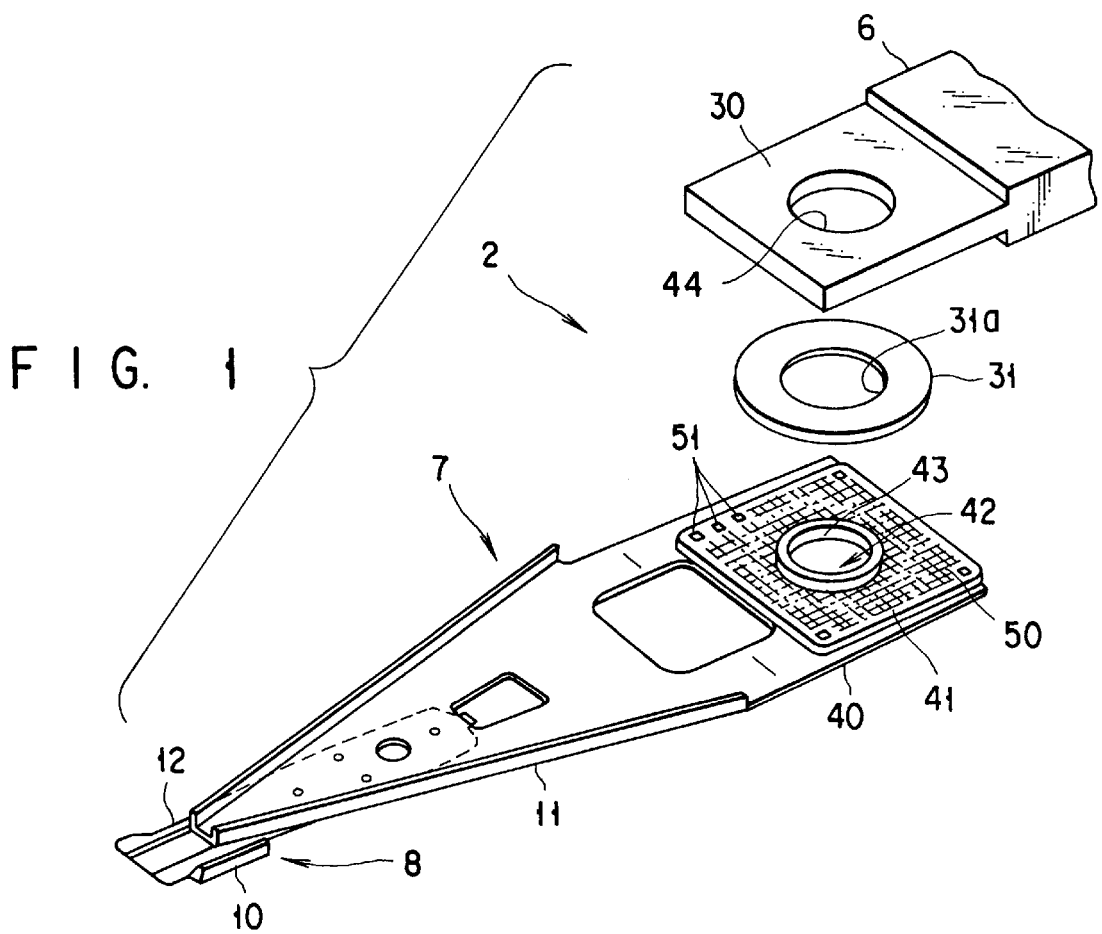
FIG. 1 is an exploded perspective view of a head supporting apparatus according to an embodiment of the present invention.

A head supporting apparatus for use in a disk drive according to an embodiment of the present invention will be described with reference to FIGS. 1 to 6. In the embodiment, the same elements as shown in FIGS. 7 and 8 are identified with the same reference numerals as used in those drawings.

FIG. 1 shows part of a carriage 2. The carriage 2 has a suspension 7 to be attached to a free end portion of an arm (actuator arm) 6. The suspension 7 is fixed to a suspension attachment portion 30 of the arm 6 by an adhesive 31.

The suspension 7 comprises a load beam 11 constituted by a precision thin plate spring made by stainless steel and a flexible member 12 called a flexure and constituted by a very thin metal plate spring. The flexible member 12 is fixed to a top end portion of the load beam 11 by laser welding or the like. A head 8 is provided on the flexible member 12. The head 8 has a slider 10, which holds a transducer (not shown) serving as a magneto-electric element.

A base plate 41 is disposed on a proximal portion 40 of the load beam 11. The base plate 41 has first and second surfaces, respectively corresponding to lower and upper surfaces in FIG. 1. The first surface of the base plate 41 is fixed to the proximal portion 40 of the load beam 11 by fixing means, such as laser welding. In a plan view, the base plate 41 is substantially rectangular, and has a boss portion 43 including a center hole 42 in its central portion.

As a material of the base plate 41, it is advisable to use austenitic stainless steel, e.g., SUS 304 or SUS 305, which contains substantially no sulfur. The composition of SUS 304 is C: 0.08% or less, Si: 1% or less, Mn: 2% or less, P: 0.04% or less, S: 0.03% or less, Ni: 8–10.5%, Cr: 18–20%, and Fe: the rest. The composition of SUS 305 is C: 0.12% or less, Si: 1% or less, Mn: 2% or less, P: 0.04% or less, S: 0.03% or less, Ni: 10.5–13%, Cr: 17–19%, and Fe: the rest.

Even when the above stainless steel is laser-welded, the sulfur component is not vaporized. Therefore, when the base plate 41 is welded to the surface of the load beam, the welded surface is not adversely influenced. It is preferable to use the aforementioned stainless steel (e.g., SUS 304 or SUS 305) as the material of the load beam 11 also. The suspension attachment portion 30 of the arm 6 has a circular hole 44, with which the boss portion 43 of the base plate 41 precisely engages.

A coarse surface 50, functioning as adhesion strengthening means, is formed on the second surface of the base plate 41, i.e., the surface which is brought into contact with the adhesive 31. The coarse surface 50 is obtained by forming a number of cavities 51 on the surface of the base plate 41 by a press process. Thus, the coarse surface 50 renders the adhesion (peel strength) of the adhesive 31 to the base plate 41 higher than the adhesion (peel strength) of the adhesive 31 to the arm 6.

Figure 2:
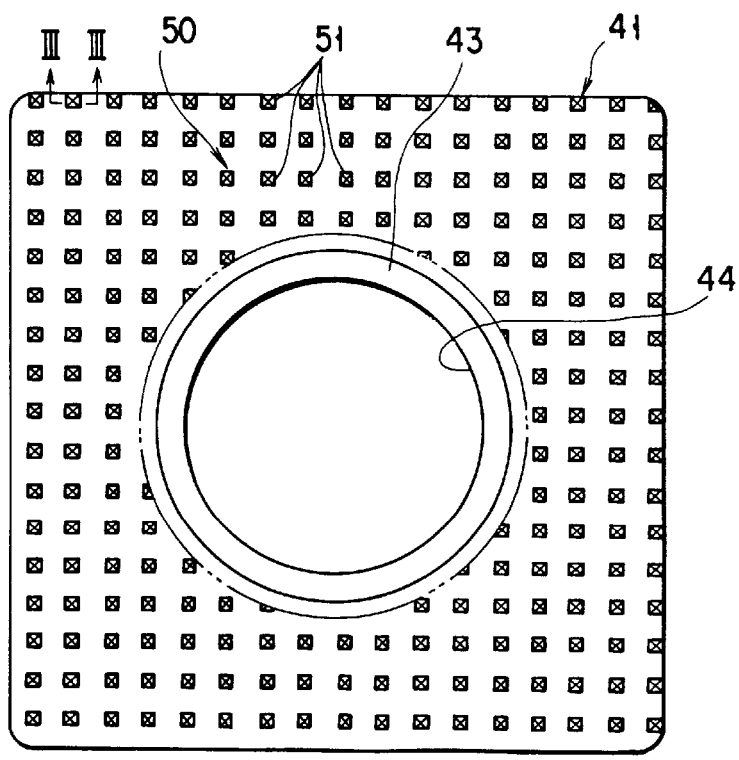
FIG. 2 is a plan view of a base plate of the head supporting apparatus shown in FIG. 1.

As shown in FIG. 2, in the coarse surface 50 functioning as adhesion strengthening means, a number of cavities 51 are arranged at regular pitch in the horizontal and vertical directions, i.e., in a matrix. The cavities 51 are formed by pressing the base plate 41 with a press die (not shown) in the direction of thickness. The die has a number of conical projections corresponding to the cavities 51 in its inner surface. The projections are formed by machining the inner surface of the die by means of a cutting tool, such as a grinder having a sharp-edged blade. The cavities 51 may be arranged concentrically around the boss portion 43 at regular pitch.

Figure 3A:
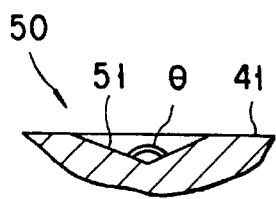
FIG. 3A is a cross-sectional view of the base plate taken along the line III—III in FIG. 2.
Figure 3B:
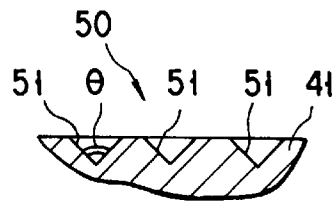
FIGS. 3B and 3C are cross-sectional views showing modifications of cavities formed in the base plate.
Figure 3C:
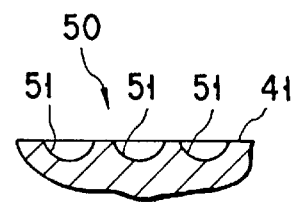
Figure 4:
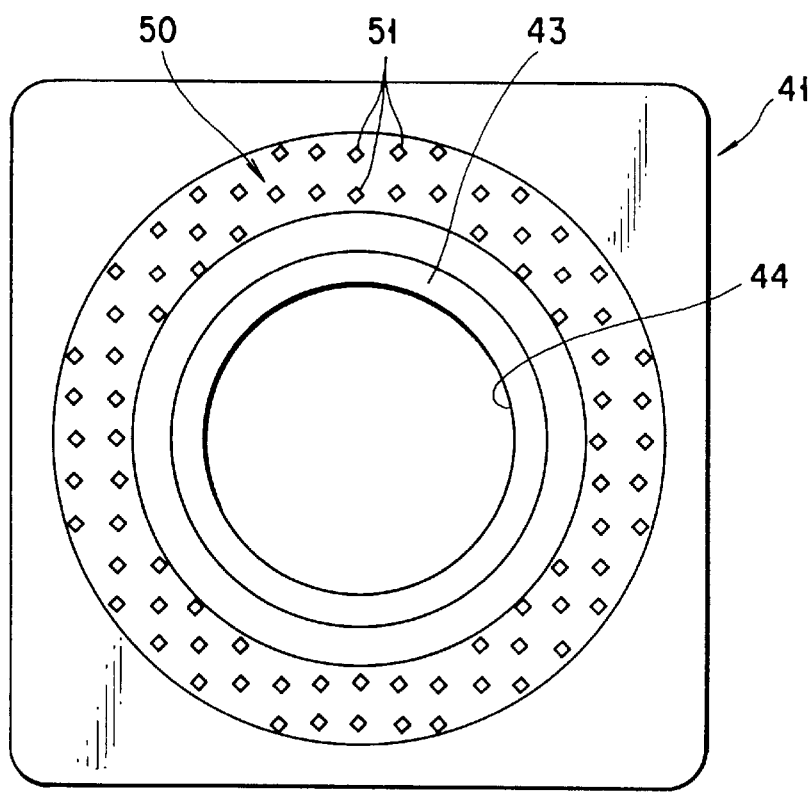
FIG. 4 is a plane view of a modification of the base plate.
Figure 5:
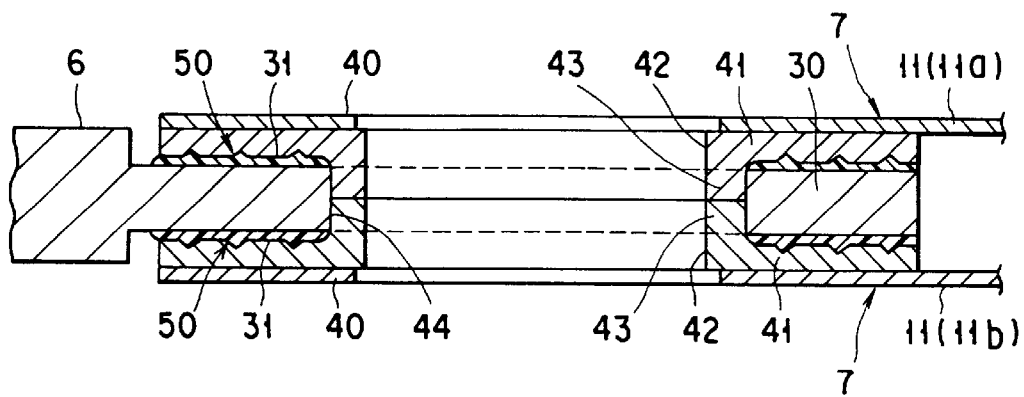
FIG. 5 is a cross-sectional view showing a state where the suspension is adhered to the arm of the head supporting apparatus shown in FIG. 1.
Figure 9A:
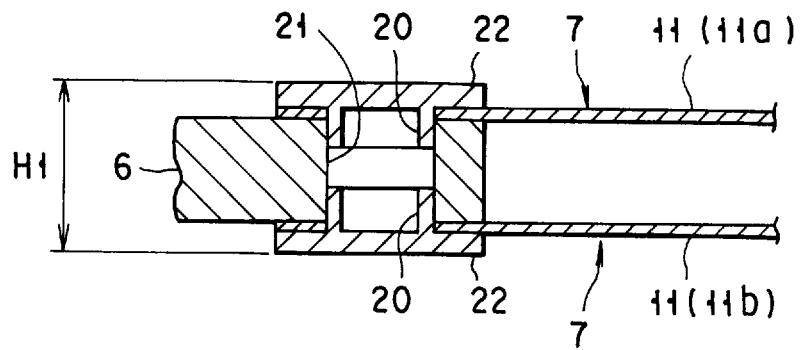
FIGS. 9A, 9B and 9C are cross-sectional views showing the conventional suspension fixing means.
Figure 9B:
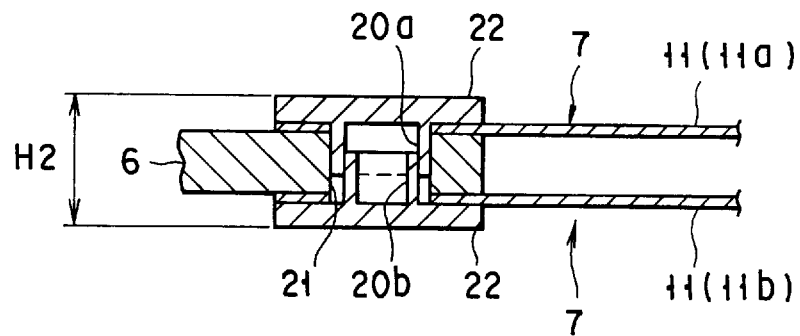
Figure 9C:
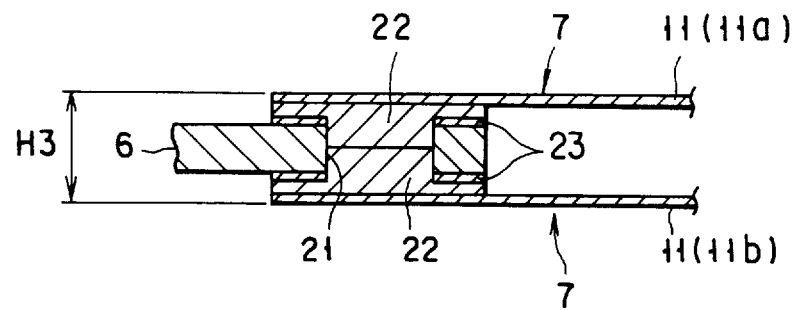

The cavity 51 may be a pyramidal or conical cavity having a vertical angle θ of 90° or greater as shown in FIG. 3A, or a vertical angle θ of 90° or smaller as shown in FIG. 3B. Further, it may be a cavity having an arc-shaped cross section as shown in FIG. 3C. Furthermore, like cross hatch obtained by honing or the like, a number of grooves may be formed on the base plate 41. Alternatively, the adhesion of the adhesive 31 to the base plate 41 may be strengthened by a chemical surface process to be greater than that of the adhesive 31 to the arm 6. Otherwise, as shown in FIG. 4, the adhesion strengthening means (e.g., the coarse surface 50) may be formed around the boss portion 43 in the form of a ring or any other form.

As shown in FIG. 1, sheet-like adhesive 31, made of unhardened epoxy resin and shaped in a predetermined form (a ring form in FIG. 1), is provided between the base plate 41 and the arm 6. The unhardened adhesive 31 has a circular hole 31a, through which the boss portion 43 can be inserted. The adhesive 31 is put on the base plate 41, and thereafter, the boss portion 43 of the base plate 41 is engaged with the hole 44 of the arm 6. Then, the suspension attachment portion 30 is disposed on the base plate 41 with the adhesive 31 interposed therebetween. Subsequently, the adhesive 31 is heated to a predetermined temperature, so that the adhesive 31 is hardened. As a result, the base plate 41 and the arm 6 are fixed to each other by the adhesive 31. It is preferable that the adhesive 31 be of a heat-hardening type.

Since the base plate 41 is welded to the load beam 11 in advance, when the base plate 41 is fixed to the arm 6 by the adhesive 31, the suspension 7 is fixed to the arm 6. In the example shown in FIG. 5, a pair of upper and lower suspensions 7 are adhered to the upper and lower surfaces of the suspension attachment portion 30 of the arm 6 via the adhesive 31.

After the adhesive 31 is hardened, the product is subjected to examinations, such as a performance test of the suspension 7. If a result of the examinations does not reach a certain level, it is necessary to exchange the suspension 7 with another. In this case, the base plate 41 of the suspension 7 is removed from the suspension attachment portion 30 of the arm 6.

The coarse surface 50 functioning as adhesion strengthening means is formed on the base plate 41, whereas the surface of the suspension attachment portion 30 of the arm 6 is polished and flat. Therefore, the adhesion of the adhesive 31 to the base plate 41 is greater than that to the arm 6.

For this reason, when the base plate 41 is peeled off the suspension attachment portion 30, the adhesive 31 remains on the base plate 41 and prevented from remaining on the arm 6, as shown in FIG. 6. Moreover, if one of the upper and lower suspensions 7 (the lower suspension 7 in FIG. 6) is to be peeled off the arm 6, the other suspension (the upper suspension 7 in FIG. 6) cannot be adversely influenced, for example, deformed. Therefore, a defective suspension only can be exchanged with a new suspension.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A head supporting apparatus for use in a disk drive having an arm driven by a positioning motor and a suspension to which a head is attached at its distal end portion, said apparatus comprising:

a base plate having first and second surfaces, said first surface being fixed to the suspension;

an adhesive provided between the second surface of the base plate and an end portion of the arm;

adhesion strengthening means, provided on the second surface of the base plate, for rendering adhesion of the adhesive to the base plate greater than adhesion of the adhesive to the arm.

2. The head supporting apparatus according to claim 1, wherein the adhesion strengthening means is a coarse surface including a number of minute cavities formed on the base plate.

3. The head supporting apparatus according to claim 2, wherein:

the base plate is made of austenitic stainless steel which contains substantially no sulfur;

the suspension includes a load beam made of austenitic stainless steel which contains substantially no sulfur; and the base plate is fixed to the load beam by laser welding.

4. The head supporting apparatus according to claim 1, wherein the arm is of a die cast form made of aluminum alloy and a surface of the arm which is brought into contact with the adhesive is polished.

5. The head supporting apparatus according to claim 1, wherein a circular boss portion is formed on the base plate and a circular hole to be engaged with the boss portion is formed in the arm.

6. The head supporting apparatus according to claim 5, wherein the adhesive is sheet-like adhesive made of heat-hardening resin having a circular hole through which the boss portion can be inserted.

* * * * *